(12) United States Patent
Harrison et al.

(10) Patent No.: US 11,712,046 B2
(45) Date of Patent: Aug. 1, 2023

(54) APPARATUS FOR DELIVERING FROZEN CONFECTION COMPRISING PARTICULATE MATERIAL

(71) Applicant: Conopco, Inc., Englewood Cliffs, NJ (US)

(72) Inventors: Frederick Jethro Harrison, Cambridge (GB); Joshua Matthew Alessandro Lanzon-Miller, Milton Keynes (GB); Paul Scott, Histon (GB); Andrew Julian Stockdale, Haslingfield (GB)

(73) Assignee: Conopco, Inc., Englewood Cliffs, NJ (US)

( * ) Notice: Subject to any disclaimer, the term of this patent is extended or adjusted under 35 U.S.C. 154(b) by 1364 days.

(21) Appl. No.: 16/067,866

(22) PCT Filed: Dec. 9, 2016

(86) PCT No.: PCT/EP2016/080426
§ 371 (c)(1),
(2) Date: Jul. 3, 2018

(87) PCT Pub. No.: WO2017/118524
PCT Pub. Date: Jul. 13, 2017

(65) Prior Publication Data
US 2020/0260755 A1    Aug. 20, 2020

(30) Foreign Application Priority Data
Jan. 8, 2016   (EP) ..................................... 16150632

(51) Int. Cl.
*A23G 9/28*   (2006.01)
*A23G 9/08*   (2006.01)
(Continued)

(52) U.S. Cl.
CPC ............... *A23G 9/281* (2013.01); *A23G 9/08* (2013.01); *A23G 9/28* (2013.01); *B65G 3/04* (2013.01);
(Continued)

(58) Field of Classification Search
CPC . A23G 9/281; A23G 9/08; A23G 9/28; A23G 9/22; A23G 2200/14; B01F 35/711; B65G 3/04; B65G 11/066; B65G 47/08
(Continued)

(56) References Cited

U.S. PATENT DOCUMENTS 2,130,113 A   9/1938 Adams
2,579,724 A   4/1946 Breakstone
(Continued)

FOREIGN PATENT DOCUMENTS

CN   1034895   8/1989
CN   2190525   3/1995
(Continued)

OTHER PUBLICATIONS

Co-pending Application: Applicant: Scott et al., U.S. Appl. No. 16/067,826, filed Jul. 3, 2018.
(Continued)

*Primary Examiner* — Lien M Ngo
(74) *Attorney, Agent, or Firm* — Gerard J. McGowan, Jr.

(57) ABSTRACT

An apparatus (10) for delivering particulate material (50) to a flowing stream of frozen confectionery material (40) to provide a single serving to a consumer, the apparatus comprising: a dispenser for the particulate material; and a dispenser for providing the flowing stream of confectionery material flowing vertically downwards from an outlet (22), the flowing stream having an outer surface; wherein the dispenser for the particulate material comprises a particulate material deposition device (12) for depositing the particulate
(Continued)

material at a common particulate deposition location (30), and a plurality of chutes (26), each chute arranged to catch deposited particulate material and redirect it in a substantially horizontal direction to collide with the outer surface of the flowing stream of frozen confectionery, each chute (26) beginning at the common particulate deposition location (30) and spreading out from each other to each deposit the particulates at a different radial location around the flowing stream of frozen confectionery.

19 Claims, 5 Drawing Sheets

(51) Int. Cl.
  *B65G 3/04* (2006.01)
  *B65G 11/06* (2006.01)
  *B65G 47/08* (2006.01)
  *B01F 35/71* (2022.01)

(52) U.S. Cl.
  CPC ............ *B65G 11/066* (2013.01); *B65G 47/08* (2013.01); *B01F 35/711* (2022.01)

(58) Field of Classification Search
  USPC .................... 366/181.3, 181.1, 177.1, 183.1; 222/145.5, 145.6, 146.6; 426/515–519, 426/524
  See application file for complete search history.

(56) References Cited

U.S. PATENT DOCUMENTS

| | | | |
|---|---|---|---|
| 2,764,385 A | 9/1956 | Sieling | |
| 3,052,381 A | 4/1962 | Carpigiani | |
| 3,536,925 A | 10/1970 | Schmidt | |
| 4,162,030 A | 7/1979 | Capra | |
| 4,447,458 A | 5/1984 | Roth et al. | |
| 4,491,064 A | 1/1985 | Schmidt | |
| 4,645,093 A | 2/1987 | Jones | |
| 4,711,376 A | 12/1987 | Manfroni | |
| 4,878,760 A | 7/1989 | Newton et al. | |
| 5,150,820 A | 9/1992 | McGill | |
| 5,199,609 A | 4/1993 | Ash, Jr. | |
| 5,368,195 A | 11/1994 | Pleet | |
| 5,421,484 A | 6/1995 | Beach | |
| 5,463,878 A | 7/1995 | Parekh et al. | |
| 5,492,249 A | 2/1996 | Beach | |
| 5,494,194 A | 2/1996 | Topper et al. | |
| 5,505,336 A | 4/1996 | Montgomery | |
| 5,533,922 A | 7/1996 | Yamaharu | |
| 5,556,268 A | 9/1996 | Topper | |
| 5,788,120 A | 4/1998 | Stumler | |
| 5,772,075 A | 6/1998 | Ash, Jr. | |
| 5,775,533 A | 7/1998 | Schroeder | |
| 5,816,455 A | 10/1998 | Alpers | |
| 6,068,160 A | 5/2000 | Fancher | |
| 6,098,849 A | 8/2000 | McInnes | |
| 6,145,701 A | 11/2000 | Van Der Merwe | |
| 6,155,461 A | 12/2000 | Ishihara | |
| 6,264,066 B1 | 7/2001 | Vincent | |
| 6,299,025 B1 | 10/2001 | Watanabe | |
| 6,378,740 B1 | 4/2002 | Martin | |
| 6,435,377 B2 | 8/2002 | Iwata et al. | |
| 6,453,803 B1 | 9/2002 | Sodeyama | |
| 6,564,973 B1 | 5/2003 | Brown | |
| 6,637,214 B1 | 10/2003 | Leitzke | |
| 6,824,017 B2 | 11/2004 | Sluijter | |
| 7,017,783 B1 | 3/2006 | Hunter et al. | |
| 7,021,500 B1 | 4/2006 | Finn | |
| 7,165,878 B1* | 1/2007 | Mimran ................... | A23G 9/24 366/177.1 |
| 7,178,976 B2 | 2/2007 | Gerber | |
| 7,318,324 B2 | 1/2008 | Ultich et al. | |
| 7,451,613 B2 | 11/2008 | Barraclough et al. | |
| 7,540,376 B2 | 6/2009 | Mahieu | |
| 7,621,669 B1 | 11/2009 | Gerber | |
| 7,665,398 B2 | 2/2010 | Gerber | |
| 7,837,065 B2 | 11/2010 | Furner | |
| 7,886,903 B1 | 2/2011 | Wurzelbacher, Jr. | |
| 8,061,562 B2 | 11/2011 | Carpenter | |
| 8,239,882 B2 | 7/2012 | Law | |
| 8,297,182 B2 | 10/2012 | Cocchi et al. | |
| 8,348,104 B2 | 1/2013 | Py | |
| 8,905,458 B2 | 12/2014 | Pipp | |
| 11,259,542 B2* | 3/2022 | Jacob ........................ | A23G 9/08 |
| 2001/0038019 A1 | 11/2001 | Vincent et al. | |
| 2001/0050116 A1 | 12/2001 | Skell | |
| 2002/0050496 A1 | 5/2002 | Van Der Meer | |
| 2003/0066844 A1 | 4/2003 | Boal, Jr. | |
| 2003/0142581 A1 | 7/2003 | Barton | |
| 2003/0183090 A1 | 10/2003 | Binley et al. | |
| 2004/0099695 A1 | 5/2004 | Finn | |
| 2005/0067433 A1 | 3/2005 | Brandt et al. | |
| 2005/0161469 A1 | 7/2005 | Roady | |
| 2005/0173469 A1 | 8/2005 | Lingenhoff | |
| 2005/0218157 A1 | 10/2005 | McMahon | |
| 2005/0230416 A1 | 10/2005 | McMahon | |
| 2006/0006199 A1 | 1/2006 | Shin | |
| 2006/0054614 A1 | 3/2006 | Baxter | |
| 2006/0157152 A1 | 7/2006 | Wolski et al. | |
| 2007/0110872 A1* | 5/2007 | Gerber .................. | B01F 27/923 426/565 |
| 2007/0194052 A1 | 8/2007 | McMahon | |
| 2007/0199614 A1 | 8/2007 | Cocchi | |
| 2007/0241140 A1 | 10/2007 | Cocchi | |
| 2008/0317909 A1 | 12/2008 | Gispert et al. | |
| 2009/0016150 A1 | 1/2009 | Mimran | |
| 2010/0028778 A1 | 4/2010 | Schuch et al. | |
| 2010/0116846 A1 | 5/2010 | Cortese | |
| 2011/0310695 A1* | 12/2011 | Sus .......................... | A23G 9/28 366/177.1 |
| 2012/0048885 A1 | 3/2012 | Anderson | |
| 2012/0052163 A1 | 3/2012 | Doleac et al. | |
| 2013/0064943 A1 | 3/2013 | Feola | |
| 2013/0136835 A1 | 5/2013 | Fiedler | |
| 2014/0252029 A1 | 9/2014 | Kallgren et al. | |
| 2015/0043306 A1 | 2/2015 | Ubbesen | |
| 2015/0101357 A1 | 4/2015 | Ugolini | |
| 2015/0237884 A1 | 8/2015 | McGill | |
| 2015/0320078 A1 | 11/2015 | Cocchi | |
| 2016/0016785 A1 | 1/2016 | Tartier | |
| 2016/0255859 A1 | 9/2016 | Salerno | |

FOREIGN PATENT DOCUMENTS

| | | |
|---|---|---|
| CN | 1960640 | 5/2007 |
| CN | 1968738 | 5/2007 |
| CN | 201267164 | 7/2009 |
| CN | 104202997 | 12/2014 |
| CN | 203985912 | 12/2014 |
| CN | 204350996 | 5/2015 |
| DE | 10206383 | 8/2003 |
| EP | 1277411 | 1/2003 |
| EP | 1348342 | 10/2003 |
| EP | 1450318 | 8/2004 |
| EP | 1449441 | 12/2005 |
| EP | 1731040 | 12/2006 |
| EP | 1952699 | 8/2008 |
| EP | 2189067 | 5/2010 |
| EP | 2255673 | 12/2010 |
| EP | 2485627 | 9/2013 |
| FR | 2433362 | 3/1980 |
| FR | WO05100187 | 10/2005 |
| GB | 2234556 | 2/1991 |
| GB | 2418970 | 4/2006 |
| JP | 2001095495 | 4/2001 |
| JP | 2001299228 | 10/2001 |
| JP | 2003174848 | 6/2003 |
| JP | 2007282611 | 11/2007 |
| WO | WO9101090 | 2/1991 |
| WO | WO9414333 | 7/1994 |
| WO | WO9820747 | 5/1998 |

(56) References Cited

FOREIGN PATENT DOCUMENTS

| WO | WO0064770 | 11/2000 |
|---|---|---|
| WO | WO03017776 | 3/2003 |
| WO | WO03096821 | 11/2003 |
| WO | WO2004026756 | 4/2004 |
| WO | WG04067386 | 8/2004 |
| WO | WO2005020703 | 3/2005 |
| WO | WO2005031226 | 4/2005 |
| WO | WO2005039303 | 5/2005 |
| WO | WO2005086749 | 9/2005 |
| WO | WO2006117274 | 11/2006 |
| WO | WO2007011624 | 1/2007 |
| WO | WO2007039158 | 4/2007 |
| WO | WO2007095441 | 8/2007 |
| WO | WO2008022300 | 2/2008 |
| WO | WO2008075190 | 6/2008 |
| WO | WO2009034592 | 3/2009 |
| WO | WO2009062875 | 5/2009 |
| WO | WO2011061344 | 5/2011 |
| WO | WO11081301 | 7/2011 |
| WO | WO2011162796 | 12/2011 |
| WO | WO2012056018 | 5/2012 |
| WO | WO2012084166 | 6/2012 |
| WO | WO2013070834 | 5/2013 |
| WO | WO2013124193 | 8/2013 |
| WO | WO2014145737 | 9/2013 |
| WO | WO2014081294 | 5/2014 |
| WO | WO2014186797 | 11/2014 |
| WO | WO2015169841 | 11/2015 |
| WO | WO2014166628 | 10/2018 |

OTHER PUBLICATIONS

Co-pending Application: Applicant: Naranjo et al., U.S. Appl. No. 16/067,829, filed Jul. 3, 2018.
Co-pending Application: Applicant: Naranjo; U.S. Appl. No. 16/067,838, filed Jul. 3, 2018.
Co-pending Application: Applicant: Cramer et al., U.S. Appl. No. 16/067,843, filed Jul. 3, 2018.
Co-pending Application: Applicant: Crundwell et al., U.S. Appl. No. 16/067,880, filed Jul. 3, 2018.
Co-pending Application: Applicant: Jacob et al., U.S. Appl. No. 16/067,901, filed Jul. 3, 2018.
IPRP2 in PCTEP2016080426; Mar. 21, 2018; pp. 1 to 9.
IPRP2 in PCTEP2016080427; Mar. 19, 2018; pp. 10 to 22.
IPRP2 in PCTEP2016080428; Feb. 5, 2018; pp. 23 to 36.
Written Opinion 2 in PCTEP2016080427; dated Nov. 28, 2017. pp. 37 to 42.
Written Opinion 2 in PCTEP2016080424; dated Nov. 28, 2017. pp. 43 to 49.
Search Report & Written Opinion in PCTEP2016080425; dated Feb. 23, 2017. pp. 50 to 62.
Search Report and Written Opinion in PCTEP2016080426; dated Feb. 23, 2017. pp. 63 to 74.
Search Report and Written Opinion in PCTEP2016080428; dated Feb. 9, 2017. pp. 1 to 15.
Search Report and Written Opinion in PCTEP2016080424; dated Feb. 6, 2017. pp. 16 to 27.
Search Report and Written Opinion in EP16150663; dated Jun. 23, 2016. pp. 28 to 34.
Search Report & Written Opinion in EP16150661; dated Jun. 21, 2016. pp. 35 to 42.
Search Report & Written Opinion in EP16150632; dated Jun. 9, 2016. pp. 43 to 49.
Search Report & Written Opinion in EP16150638; dated Jun. 1, 2016. pp. 50 to 56.
Search Report and Written Opinion in EP16150648; dated Jun. 29, 2016. pp. 57 to 66.
Search Report & Written Opinion in EP16150643; dated Jun. 9, 2016, pp. 67 to 73.
Search Report and Written Opinion in PCTEP2016080423; dated Mar. 17, 2017. pp. 74 to 86.
Search Report and Written Opinion in EP16150649; dated Jun. 23, 2016. pp. 1 to 10.
Search Report and Written Opinion in PCTEP2016080431; dated Feb. 9, 2017 . pp. 11 to 22.
Written Opinion 2 in PCTEP2016080423; dated Nov. 28, 2017. pp. 23 to 35.
IPRP2 in PCTEP2016080431; Nov. 22, 2017. pp. 36 to 47.
Search Report and Written Opinion in EP16150656; dated Jun. 21, 2016. pp. 48 to 59,.
Search Report & Written Opinion in EP16150660; dated Jun. 1, 2016. pp. 60 to 67.
Search Report and Written Opinion in PCTEP2016080427; dated Mar. 16, 2017. pp. 68 to 80.
IPRP2 in PCTEP2016080429; Mar. 21, 2018. pp. 1 to 13.
Search Report and Written Opinion in PCTEP2016080429; dated Feb. 23, 2017. pp. 14 to 27.
Written Opinion in PCTEP2016080429; dated Nov. 17, 2017. pp. 28 to 32.
IPRP2 in PCTEP2016080430; Mar. 19, 2018. pp. 33 to 43.
Search Report and Written Opinion in PCTEP2016080430; dated Mar. 16, 2017. pp. 44 to 57.
Written Opinion 2 in PCTEP2016080430 ; dated Nov. 17, 2017. pp. 58 to 63.
IPRP2 in PCTEP2016080423; Mar. 19, 2018. pp. 64 to 76.
IPRP2 in PCTEP2016080425; Nov. 20, 2017. pp. 77 to 90.
IPRP2 in PCTEP2016080424; Mar. 26, 2018. pp. 91 to 98.

* cited by examiner

APPARATUS FOR DELIVERING FROZEN CONFECTION COMPRISING PARTICULATE MATERIAL

TECHNICAL FIELD

The invention relates to an apparatus for dispensing frozen confectionery, particularly a single serving thereof, comprising particulate material, particularly mixed-in particulate material.

BACKGROUND AND PRIOR ART

There is a significant consumer demand for frozen confectionery, particularly ice cream, which contains particulate material. When such particulate material is not merely added as a topping but is mixed into the frozen confectionery then they are also referred to as mix-ins.

Apparatus and machines exist which are capable of dispensing a frozen confectionery with a selection of mix-ins that have been selected by an end user.

U.S. Pat. No. 4,447,458 discloses an ice cream machine that brings particulate material into contact with the outside wall of a stream of ice cream. The particulate material is pressed into the outside surface by passing the material through a constraining surface so that it is forced to embed within the ice cream by the surface.

WO 2011/162796 discloses an apparatus which comprises a plurality of particulate confection hoppers which are each directed to deliver particulate material at a different radial location of a flowing stream of ice cream. Each hopper is separately controlled and in some embodiments need to be actuated individually to deliver the particulate material as desired.

EP 1277411 A2 discloses an apparatus for preparing ice cream containing particulate material wherein the particulate material is fed directly into the flowing stream of ice cream from a number of feeder pipes.

Improvements in this area would therefore be highly desirable.

SUMMARY OF INVENTION

The invention relates to an apparatus for delivering particulate material to a flowing stream of frozen confectionery material, the apparatus comprising
 a dispenser for the particulate material; and
 a dispenser for providing the flowing stream of confectionery material flowing vertically downwards from an outlet, the flowing stream having an outer surface;
wherein the dispenser for the particulate material comprises a particulate material deposition device for depositing the particulate material at a common particulate deposition location, and a plurality of chutes, each chute arranged to catch deposited particulate material and redirect it in a substantially horizontal direction to collide with the outer surface of the flowing stream of frozen confectionery, each chute beginning at the common particulate deposition location and spreading out from each other to each deposit the particulate material at a different radial location around the flowing stream of frozen confectionery.

Thus, the apparatus utilises a source of particulate material which is deposited onto a common starting location for a plurality of chutes. The chutes are arranged to redirect the particulate material to travel in a substantially horizontal direction. Additionally, the chutes spread out from each other to direct the particulate material to collide with different radial positions on the outer surface of the frozen confection. In this way a single source of particulate material is delivered around a significant portion of the outer surface of the flowing frozen confection.

In a preferred embodiment, the arrangement is such that the flowing stream of confectionery is not in contact with any subsequent supporting surface after leaving the outlet. This reduces the amount of cleaning that is required and provides a more hygienic arrangement.

It has been found that from two to five chutes provides a convenient number of chutes for providing the particulate material substantially around the radial surface of the flowing stream of frozen confectionery. In a preferred embodiment there are three chutes.

It has been found that the ends of the chute are ideally not completely horizontal. In a preferred embodiment the ends of the chutes are at an angle to horizontal of from 10 to 30°.

This provides a more effective projection angle and increases the chance that the particulate material will embed themselves in the flowing stream of frozen confectionery.

In a particularly preferred embodiment, the outlet has a star-shaped opening shaped in cross section to have a central hub and at least three spokes, thereby to produce a flowing stream of frozen confectionery initially having the same cross section as that of the nozzle and an outer surface that undulates. Not only does this provide an attractive appearance but also performs a useful technical function. In particular it increases the available surface area of the outer surface of the frozen confectionary, which means that the chance of particulate material embedding itself into the outer surface of the frozen confectionery is increased.

In a further refinement of this arrangement, it is particularly preferred that the chutes are aligned to project the particulate material onto the end of a respective spoke of the frozen confectionery. It has been found that such ends tend to have a higher temperature due to the increased surface area, and even a degree Celsius increase can increase the softness of the frozen confectionery. This can have a surprising effect on the likelihood of the particulate material adhering to the outer surface of the frozen confectionery.

Although the particulate material dispenser can take a variety of forms, it has been found that a particular arrangement allows for a particularly convenient and flexible way to dispense particulate material to the common deposition location. As such it is preferred that the particulate material dispenser comprises a chamber having an open exit, wherein the chamber is adapted to be rotatable in use such that the open exit follows a pathway having both an upper region and a lower region, and arranged to pass through the lower region at a non-zero speed a plurality of times during a single serving; the open exit being sized to allow a portion of stored particulate material to fall out of the chamber via the open exit under gravity each time the open exit passes through the lower region of the pathway.

In a convenient arrangement the rotating chamber rotates within a stationary housing. Such a stationary housing blocks the open exit but has an opening which overlaps with the open exit when it passes through the lower region of the pathway. This ensures that no particulate material leaves the container until it is in its lower region, and the overlap with the opening controls the amount of particulate material that may leave the chamber on a single pass through the lower region.

In a preferred embodiment the open exit and the opening in the stationary housing are shaped such that the region of overlap, as the open exit moves away from the lower region of the pathway and the region of overlap closes, is shaped to taper providing a gradual closing of the region of overlap. This gradual tapering provides a pinching and slicing effect, so that any particulate material that is trapped in the region of overlap as it reduces in size is broken and/or cut and/or sliced by the tapering region of overlap.

The chamber may rotate in a variety of different manners, however it has been found that rotation about a substantially horizontal axis, the pathway thereby being a substantially vertical circle, provides a convenient arrangement and one which is mechanically more simple to provide.

In a preferred embodiment, the apparatus is arranged to provide the supply of frozen confectionery simultaneously with the rotation of the chamber.

As discussed above, the open exit is arranged to pass through its lower region a plurality of times. It has been found to be particularly advantageous to arrange for the open exit to pass through the lower region at least 5 times during a single serving, preferably more than 10 times. In this way, only a fraction of the total amount of particulate material needs to leave the container during each pass through the lower region.

Although the container could be rotated by hand it is much preferred that it is motorised so that the rotation is provided by a motor. This assists in providing a rapid rotation speed which can provide the multiple revolutions per single serving that is preferred.

Such a motor can follow a fixed a pre-programmed routine. However in a preferred embodiment, the motor is controlled and actuatable by a user selectable input. In this way the end user can control the action of the rotation of the container and have control over the delivery or otherwise of the particulate material. Additionally this allows an end user to choose not to add any particulate material at all to a single serving, if that is the users preference on that occasion.

In one particularly preferred embodiment, the user selectable input allows variation in the speed of rotation of the chamber in use. In a further refinement of this embodiment however, it is preferred that the speed of rotation is fixed by the apparatus at a substantially constant value whilst the open exit overlaps with the opening in the housing, i.e. when the open exit is in its lower region. In this way, the amount of particulate material that leaves the open exit in each pass through the lower region is unaffected by the speed of rotation of the chamber.

This allows the end user to increase or decrease the speed of rotation, as desired, according to whether more or less particulate material is desired for a single serving.

The apparatus as described and defined herein is primarily intended for use in the home. As such it is highly beneficial if the machine is not so sizeable that it cannot readily be position in a user's kitchen for example. As such, it is preferred that the apparatus can fit inside a cuboid container having a volume of no greater than 0.2 m³, preferably no greater than 0.1 m³.

The frozen confectionery material of the present invention may be aerated. The term "aerated" means that gas has been intentionally incorporated into the product, such as by mechanical means. The gas can be any food-grade gas such as air, nitrogen or carbon dioxide. The extent of aeration is typically defined in terms of "overrun" (OR). In the context of the present invention, % overrun is defined in volume terms (measured at atmospheric pressure) as:

$$OR = \frac{\text{volume of frozen aerated product} - \text{volume of premix at ambient temp}}{\text{volume of premix at ambient temp}} \times 100$$

The amount of overrun present in the product will vary depending on the desired product characteristics. In the context of the present invention the level of overrun is typically from 0 to 150%, preferably from 60 to 150%, more preferably from 60 to 100%.

Frozen confection material means a confection made by freezing a pasteurised mix of ingredients such as water, fat, sweetener, protein (normally milk proteins), and optionally other ingredients such as emulsifiers, stabilisers, colours and flavours. Frozen confection materials may be aerated. Frozen confection materials include ice cream, gelato, frozen yoghurt, sorbets, granitas, shaved ices and the like. Preferably the frozen confectionery material is an ice cream.

The particulate material can include discrete pieces of an edible material, such as commercially available confectionery pieces, candy, carbonated candy, chocolate, fruit (which may be e.g. fresh, dried, frozen or sugar-infused), frozen liquids, nut, seed, biscuit, cake, cookie, toffee, cereal, fudge, nougat, jelly, marshmallow and the like. Preferably the particulate material is from 1 mm to 10 mm in size, more preferably from 2 to 9 mm, most preferably from 5 to 8 mm.

The invention will now be illustrated, by way of example only, and with reference to the following figures, in which.

Figure 1:
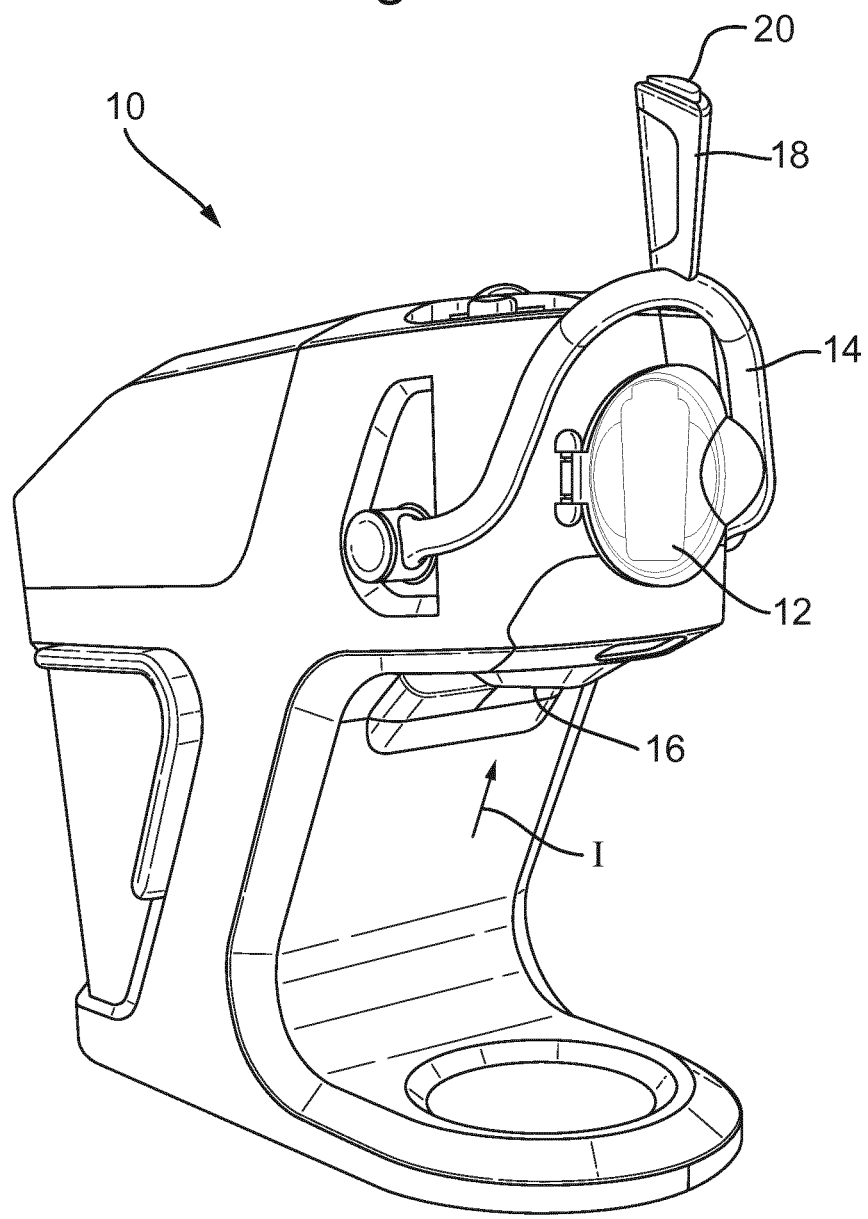
FIG. 1 is a perspective view of an apparatus according to the present invention.

Turning to the figures, FIG. 1 shows an apparatus 10 according to the invention which is adapted to deliver a frozen confection, e.g. ice cream, and associated particulate material added at the moment of delivery of the frozen confection. The apparatus is sized to be suitable for use in the home of a user.

The apparatus comprises a source of frozen confection (not shown) and a source of particulate material 12.

The apparatus has a handle 14, the downwards movement of which actuates the delivery of the frozen confection out of the outlet 16. The handle also comprises a grippable portion 18 which comprises a button 20 on the end. Pressing button 20 actuates the delivery of the particulate material to be delivered onto the flowing surface of the frozen confection material.

Thus, a user can grip the grippable portion 18 and actuate the handle 14 to deliver the frozen confection. Simultaneously, a user can also press button 20 as desired to add as much or as little particulate material as is desired to the flowing frozen confection.

Figure 2:
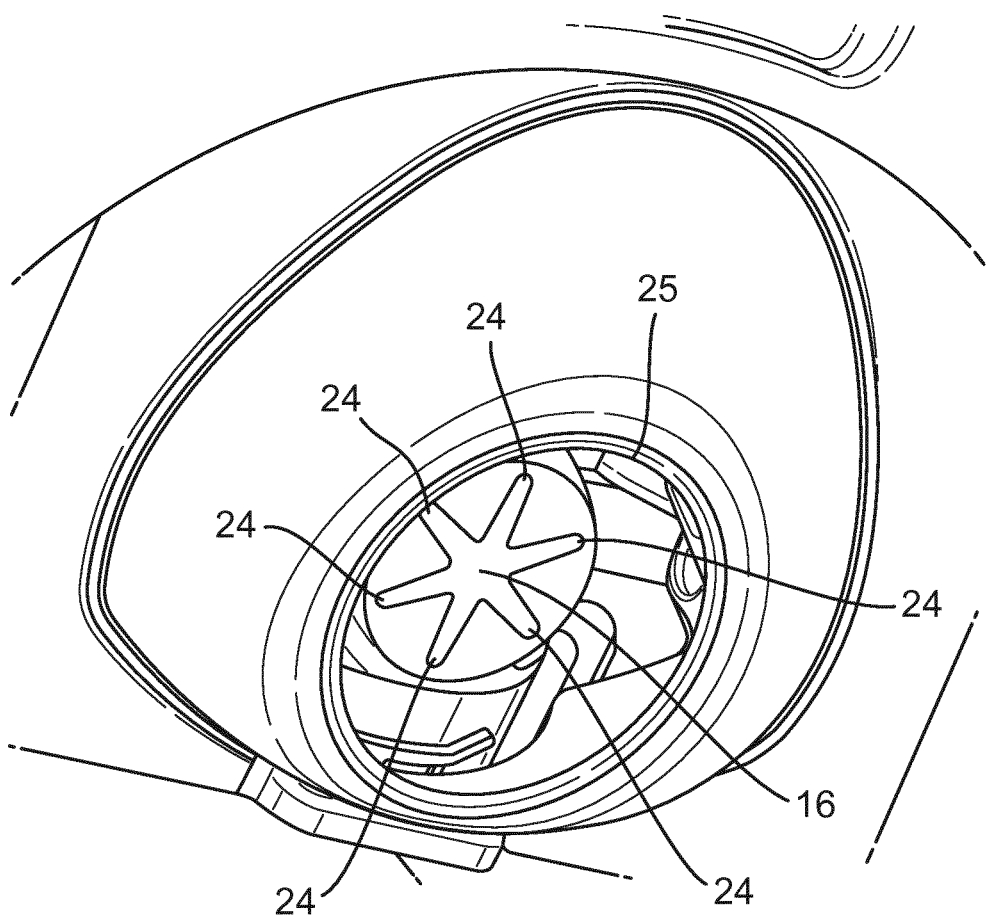
FIG. 2 is a perspective view of the outlet for the frozen confection of the apparatus shown in FIG. 1 in the direction of arrow I.

FIG. 2 shows a view of the underside of the delivery region in the direction I shown in FIG. 1. It shows the outlet 16 which comprises a six pointed star-shaped cross-section comprising a central hub with a plurality of spokes 24. Also shown is the underside of chutes 26, as will be described below.

As can be seen, once a stream of frozen confection leaves the outlet 16 it passes through opening 25 without touching it and therefore does not come into contact with any other supporting surface.

Figure 3:
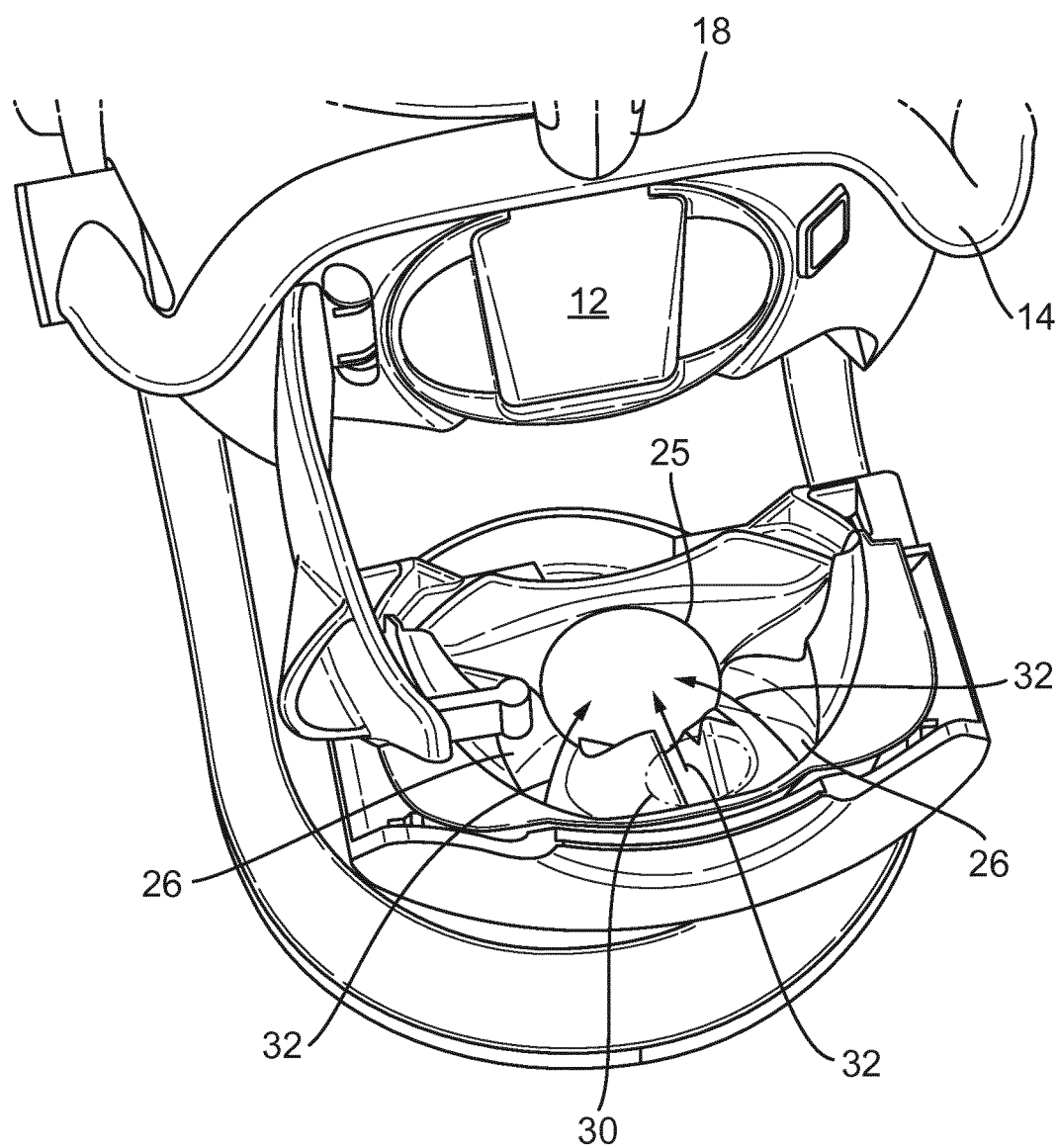
FIG. 3 is a perspective view of the chutes removed from the apparatus shown in FIG. 1.

FIG. 3 shows the delivery region with parts removed to show the internal structure. In use particulate material 12 is deposited at common location 30. Starting at this point are three chutes 26 which redirect the particulate material from a general downward vertical direction to a more substantially horizontal direction. The ends of the chutes 26 are at an angle of 20° to horizontal. Additionally the three chutes 26 are directed to spread away from each other shown with arrows 32 to direct the particulate material at different radial locations on the surface of the frozen confectionery.

In use the frozen confection will be dispensed as a stream of material which passes through opening 25 without touching the sides thereof. Particulate material will be deposited from the container 12 to common deposition location 30. The particulate material will then split between each of chutes 26 from the common deposition location 30 to different radial positions on the surface of the frozen confection.

It can be seen that chutes 26 direct the particulate material around approximately a half of the outer radial surface of the frozen confection. However as the end user will be facing the side that receives the particulate material the rear side which receive little or no particulate material will not be seen in use. Thus the appearance is that all of the front face of the frozen confection receives particulate material.

It can also be seen that the chutes 26 are aligned so that they are directed in directions 32 which each align with one of the spokes 24 of the resulting outer surface of the frozen confectionery stream. This increases the chance that individual particulate elements will collide with the ends of spokes 24, which has been found to increases the chance that the particulate material will embed itself within the outer surface of the frozen confectionery.

Figure 4:
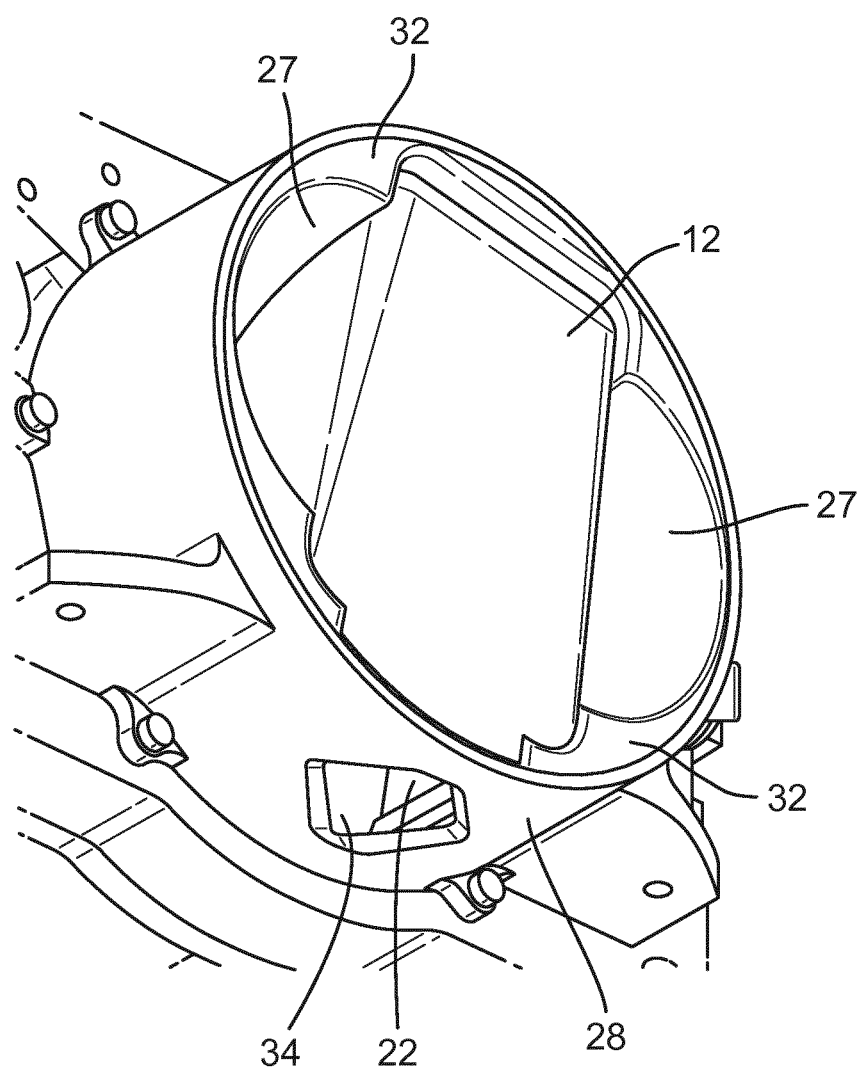
FIG. 4 is a perspective view of the internal structure of the region of the apparatus surrounding the rotating container.

FIG. 4 shows the internal structure of the apparatus in the region of the container 12. The enclosing casing has been removed to aid visualisation of the internal structure. This clearly shows the stationary housing 28 within which is rotatably mounted a rotatable housing 32.

Also shown is the opening 34 in the stationery housing 28. As the rotatable housing 32 rotates within the stationary housing 28, container 12 also rotates until the container has moved to an almost fully inverted position, as shown in FIG. 4. At this point there is overlap between the open exit 22 and the opening 34. As a result of the overlap, stored particulate material can fall out of the container via open exit 22 and opening 34.

As can be seen in FIG. 4, the opening 34 has a gradually tapering arrangement, so that the degree of overlap changes gradually as the open exit 22 passes through the lower region of its pathway. In addition this arrangement provides for a slicing action so that any particulate material that is trapped in the closing region of overlap is more easily sliced or crushed as the region of overlap closes.

Figure 5:
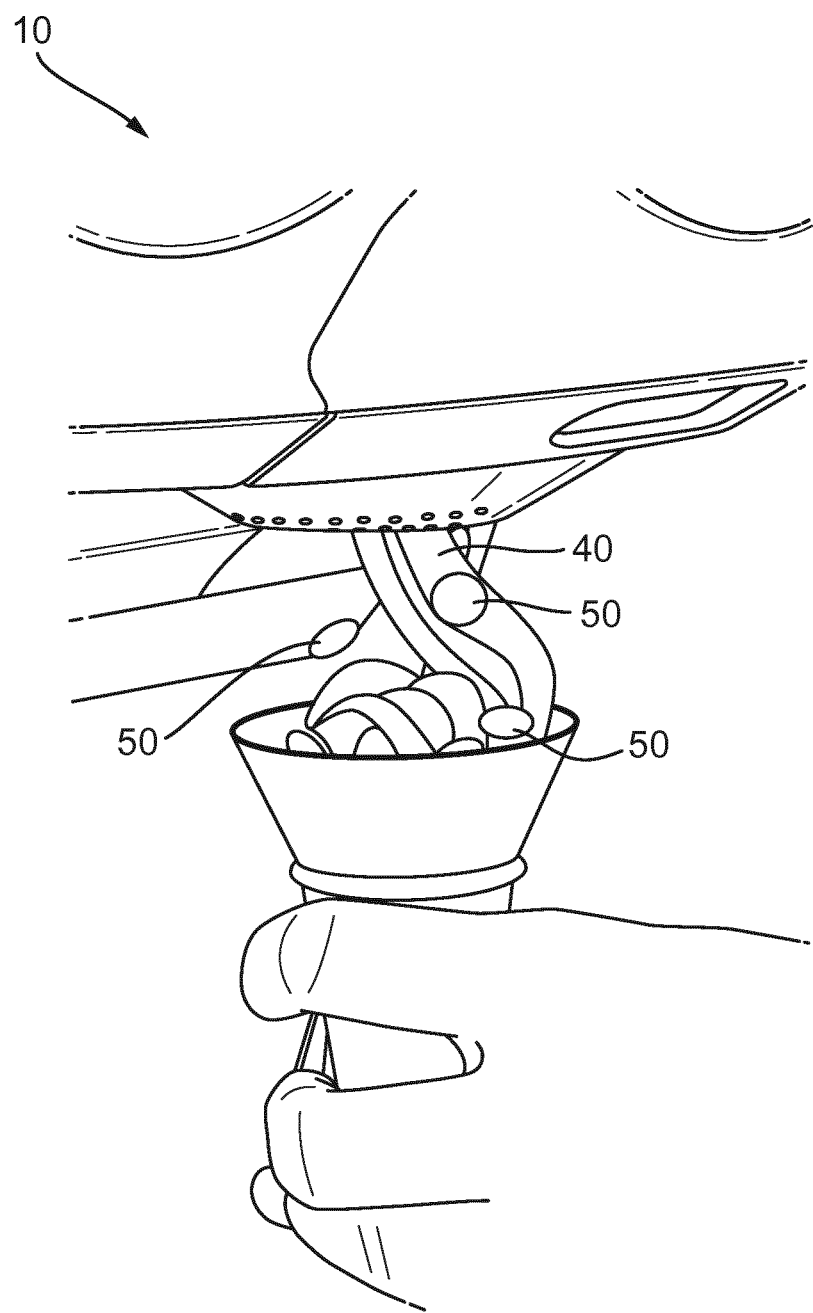
FIG. 5 is a close-up perspective view of the machine shown in FIG. 1 dispensing a frozen confection and particulate material.

FIG. 5 shows the apparatus 10 delivering a single serving of frozen confectionery material 40 and the simultaneous delivery of particulate material 50.

The invention claimed is:

1. An apparatus for delivering particulate material to a flowing stream of frozen confectionery material to provide a single serving to a consumer, the apparatus comprising:
   i. a dispenser for the particulate material; and
   ii. a dispenser for providing the flowing stream of confectionery material flowing vertically downwards from an outlet, the flowing stream having an outer surface;
   wherein the dispenser for the particulate material comprises a particulate material deposition device for depositing the particulate material at a common particulate deposition location, and a plurality of chutes, each chute arranged to catch deposited particulate material and redirect it in a substantially horizontal direction to collide with the outer surface of the flowing stream of frozen confection, each chute beginning at the common particulate deposition location and spreading out from each other to each deposit the particulates at a different radial location around the flowing stream of frozen confectionery.

2. An apparatus according to claim 1, wherein the arrangement is such that the flowing stream of confectionery is not in contact with any subsequent supporting surface in the apparatus after leaving the outlet.

3. An apparatus according to which comprises from two to five chutes.

4. An apparatus according to claim 1, wherein the ends of the chutes are at an angle to horizontal of from 10 to 30°.

5. An apparatus according to claim 1, wherein the outlet has a star-shaped opening shaped in cross section to have a central hub and at least three spokes, thereby to produce a flowing stream of frozen confectionery initially having the same cross section as that of the outlet and an outer surface that undulates.

6. An apparatus according to claim 5, wherein the chutes are aligned to project the particulate material onto the end of a respective spoke.

7. An apparatus according to claim 1, wherein the dispenser for the particulate material comprises a chamber for storing the particulate material,
   the chamber having an open exit, wherein the chamber is adapted to be rotatable in use such that the open exit follows a pathway having both an upper region and a lower region, and arranged to pass through the lower region at a non-zero speed a plurality of times during a single serving;
   the open exit being sized to allow a portion of stored particulate material to fall out of the chamber via the open exit under gravity to be deposited at the common particulate material deposition location each time the open exit passes through the lower region of the pathway.

8. An apparatus according to claim 7, wherein the rotating chamber rotates within a stationary housing, the stationary housing blocking the open exit but having an opening which overlaps with the open exit when it passes through the lower region of the pathway.

9. An apparatus according to claim 8, wherein the open exit and the opening in the stationary housing are shaped such that the region of overlap, as the open exit moves away from the lower region of the pathway and the region of overlap closes, is shaped to taper providing a gradual closing of the region of overlap.

10. An apparatus according to claim 7, wherein the chamber rotates about a substantially horizontal axis, the pathway thereby being a substantially vertical circle.

11. An apparatus according to claim 7, which is arranged to provide the supply of frozen confectionery simultaneously with the rotation of the chamber.

12. An apparatus according to claim 7, which is arranged to allow the open exit to pass through the lower region at least 5 times during a single serving, preferably more than 10 times.

13. An apparatus according to claim 7, wherein the rotation of the chamber is provided by a motor.

14. An apparatus according to claim 1 wherein the motor is actuatable by a user selectable input.

15. An apparatus according to claim 14, wherein the user selectable input allows variation in the speed of rotation of the chamber in use.

16. An apparatus according to claim 15 when dependent upon claim 8, which is adapted to fix the speed of rotation at a substantially constant value whilst the open exit overlaps with the opening in the stationary housing.

17. An apparatus according to claim 1, which can fit inside a cuboid container having a volume of no greater than $0.2^3$.

18. An apparatus according to claim 3, which comprises three chutes.

19. An apparatus according to claim 17, which can fit inside a cuboid container having a volume of no greater than $0.1^3$.

* * * * *